United States Patent
Hansson et al.

(10) Patent No.: US 10,618,520 B2
(45) Date of Patent: Apr. 14, 2020

(54) METHOD FOR DISENGAGING AN INACTIVE GEAR OF A DUAL CLUTCH TRANSMISSION AND A CORRESPONDING TRANSMISSION

(71) Applicant: VOLVO TRUCK CORPORATION, Göteborg (SE)

(72) Inventors: Mattias Hansson, Fiskebackskil (SE); Martin Hedvall Fogelquist, Mölnlycke (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 345 days.

(21) Appl. No.: 15/566,303

(22) PCT Filed: May 4, 2015

(86) PCT No.: PCT/EP2015/059699
§ 371 (c)(1),
(2) Date: Oct. 13, 2017

(87) PCT Pub. No.: WO2016/177392
PCT Pub. Date: Nov. 10, 2016

(65) Prior Publication Data
US 2018/0112770 A1    Apr. 26, 2018

(51) Int. Cl.
*B60W 30/19* (2012.01)
*F16H 61/04* (2006.01)
(Continued)

(52) U.S. Cl.
CPC ........... *B60W 30/19* (2013.01); *B60W 10/10* (2013.01); *F16H 3/48* (2013.01); *F16H 61/0437* (2013.01);
(Continued)

(58) Field of Classification Search
CPC ...... B60W 10/10; B60W 10/08; B60W 30/19; F16H 61/688
See application file for complete search history.

(56) References Cited

U.S. PATENT DOCUMENTS 6,634,986 B2   10/2003   Kima
7,992,458 B2   8/2011    Krieger et al.
(Continued)

FOREIGN PATENT DOCUMENTS

EP    1826462 A2     8/2007
WO    2014003669 A1  1/2014

OTHER PUBLICATIONS

International Search Report (dated Feb. 9, 2016) for corresponding International App. PCT/EP2015/059699.
(Continued)

*Primary Examiner* — Erin D Bishop
(74) *Attorney, Agent, or Firm* — Venable LLP; Jeffri A. Kaminski (57) ABSTRACT

A method is provided for disengaging a tooth clutch of an inactive gear in a dual clutch transmission during vehicle acceleration or retardation. The dual clutch transmission includes an engaged active gear through which torque is transmitted between an engine and driven wheels, an engaged inactive gear to be disengaged, and an electric motor drivingly connected to a shaft of the inactive gear. The method includes controlling the electric motor to provide a compensational torque for temporarily decreasing or substantially eliminating torque transferred by the tooth clutch of the inactive gear, and disengaging the engaged inactive gear. The disclosure also concerns a corresponding dual clutch transmission, a computer program, a computer readable medium, and an electronic control unit for controlling the electric motor of a dual clutch transmission.

22 Claims, 7 Drawing Sheets (51) Int. Cl.
*F16H 61/688* (2006.01)
*B60W 10/10* (2012.01)
*F16H 3/48* (2006.01)

(52) U.S. Cl.
CPC ...... *F16H 61/688* (2013.01); *B60Y 2400/421* (2013.01); *F16H 2061/0474* (2013.01); *F16H 2306/46* (2013.01)

(56) References Cited

U.S. PATENT DOCUMENTS

| | | |
|---|---|---|
| 7,992,459 B2 | 8/2011 | Krieger et al. |
| 8,608,617 B2 | 12/2013 | Stervik |
| 2002/0189397 A1 | 12/2002 | Sakamoto et al. |
| 2013/0267367 A1 | 10/2013 | Kaltenbach et al. |
| 2014/0171259 A1 | 6/2014 | Genise |
| 2014/0190309 A1 | 7/2014 | Moosmann et al. |

OTHER PUBLICATIONS

Chinese Official Action (dated Jan. 1, 2019) for corresponding Chinese App. 201580079620.1.

METHOD FOR DISENGAGING AN INACTIVE GEAR OF A DUAL CLUTCH TRANSMISSION AND A CORRESPONDING TRANSMISSION

BACKGROUND AND SUMMARY

This disclosure relates to a method for shifting from a first gear to a second gear in a dual clutch transmission during vehicle acceleration or retardation, which includes disengaging a tooth clutch of an inactive gear in the dual clutch transmission having an electric motor drivingly connected to a transmission shaft. The disclosure also relates to dual clutch transmission with an electric motor drivingly connected to a transmission shaft for a vehicle.

The method and dual clutch transmission may be used for a transmission in a utility vehicle, such as a truck or bus, or a construction vehicle such as wheel loader or articulated hauler, or any other type of vehicles, such as an automobile, motorbike, railroad vehicle, or the like.

Hybrid electric vehicle powertrains comprising a combustion engine, an electric motor and a dual clutch transmission for vehicles are known in the prior art, for example from US 2014/0171259. There is however still room for improvements in terms of drivability of the powertrain. In EP 1 826 462 A the firstly used gear disengages to become disengaged and inactive before the method opens the initially closed direct coupled gear and closes the initially open direct coupled gear. The transmission has two dog clutches. Further, the gear-changing motor unit is connected to the respective intermediate shafts through a further set of gearwheels, which gearwheels do not make a part of any one of the gears included. Other dual clutch transmissions are disclosed in US 2013/267367 A and in WO 2014/003659 A in both of which the respective transmission is combined with a planetary gear set.

This section provides a general summary of the disclosure, and is not a comprehensive disclosure of its full scope or all of its features.

A specific problem with prior art hybrid electric vehicle powertrain designs is the relatively large mass of the rotor of the electric motor. This mass results in a relatively large moment of inertia of the rotor, which moment of inertia generally by far exceeds the total moment of inertia of the individual transmission shafts of the dual clutch transmission including any gearwheels attached thereto. The term "moment of inertia" herein refers to the rotational inertia.

The dynamic behaviour of dual clutch transmission including an electric motor attached to a transmission shaft thereof is this very different from the behaviour of a dual clutch transmission without an electric motor.

This change of dynamic behaviour is particularly noticeable during elevated acceleration levels of the transmission shafts, such as during elevated vehicle acceleration and deceleration. High vehicle acceleration typically, but not limited to, occurs when high engine torque is requested from the driver, possibly also in combination with a low loading state of the vehicle and/or a downhill road segment. High vehicle deceleration typically, but not limited to, occurs when vehicle brakes are applied and/or when engaging an uphill road segment during driving.

In a dual clutch transmission there is during driving of the vehicle generally one active gear drivingly connecting the transmission input shaft with the transmission output shaft with a first gear ratio, and one inactive gear that is prepared for becoming engaged in the future and which is arranged for drivingly connecting the transmission input shaft with the transmission output shaft with a second gear ratio. The second gear ratio may either be larger or smaller than the first gear ratio, such as to provide a change in transmission ratio. The selection between the active gear and the inactive gear is performed by selective control of the dual clutches, where one clutch is drivingly connected to the active gear and the other clutch is drivingly connected to the inactive gear.

After a gear change, i.e. after essentially simultaneous disconnection of the clutch associated with the first gear ratio and connection of the clutch associated with the second gear ratio, the first gear ratio is initially kept for a certain time period. The next required gear ratio may either be the first gear ratio again or a third gear ratio different from both the first and second gear ratio. If a transmission electronic control unit after a certain time period decides to change the currently inactive gear associated with the first gear ratio to a gear having the third gear ratio, the currently engaged inactive gear is disengaged by controlling an associated tooth clutch actuating mechanism to apply disengagement force.

The required disengagement force for disengaging the currently engaged inactive gear depends among others on the torque that is currently transmitted by the tooth clutch. One particular problem with relatively high vehicle acceleration and deceleration levels is that a relatively high torque is required when an electric motor is drivingly connected to a shaft of the currently engaged inactive gear. A rotor of the electric motor is drivingly connected to the shaft of the currently engaged inactive gear and the mass of the rotor is typically relatively high. Since the moment of inertia of the rotor depends on the mass and mass distribution of the rotor, and since the moment of inertia of any rigid body determines the torque needed for a desired angular acceleration, a relatively high torque is transmitted by the tooth clutch during driving situation having relatively high vehicle acceleration and deceleration levels.

Specifically, in situations where the electric motor is passive, i.e. not controlled to provide any output torque, the relatively large mass of the rotor of the electric motor requires the tooth clutch to transmit a relatively large torque for providing the rotor with the current angular acceleration.

The relatively high torque transmitted by the tooth clutch may require a gear disengagement force exceeding the maximal available gear disengagement force, for example due to limitations in terms of tooth clutch actuating mechanism capacity. As a result, the tooth clutch actuating mechanism may during high vehicle acceleration or deceleration levels be temporarily incapable of disengaging the inactive gear due to the high disengagement force that is required. The engagement of the next inactive gear may as a consequence be delayed, such that the next gear change also becomes delayed. Improvements in terms of drivability of the powertrain are consequently desirable.

It is desirable to provide a method for disengaging a tooth clutch of an inactive gear in a dual clutch transmission during vehicle acceleration or retardation where the previously mentioned problem is at least partly avoided.

According to an aspect of the present invention, a method is provided for shifting from a first gear to a second gear in a dual clutch transmission (10) during vehicle acceleration or retardation, the dual clutch transmission comprising:

a first gear which is engaged and active such that torque is transmitted between an engine (11) and driven wheels (4) there through, the first gear being disconnectable from the engine by a first friction clutch, the first friction clutch being closed, a second gear to be engaged, which is disengaged and inactive such that no torque is transmitted between the engine (11) and the driven wheels (4) there through, the second gear being disconnectable from the engine by a second friction clutch, the second friction clutch being open, an electric motor (41) drivingly connected to a shaft (21) of the one of the first gear or the second gear which is inactive, the method comprises the steps of:

engaging the second gear to become an engaged inactive gear, essentially simultaneously opening the first friction clutch and closing the second friction clutch such that engine torque is transmitted to the driven wheels through the second gear, thereby the first gear becomes engaged and inactive and the second gear becomes engaged and active, controlling the electric motor (41) to provide a compensational torque for temporarily decreasing or substantially eliminating torque transferred by a tooth clutch (35) of the inactive gear, disengaging the first gear by disengaging the tooth clutch (35) such that the first gear thereby becomes disengaged and inactive.

By controlling the electric motor to provide a compensational torque for temporarily decreasing or substantially eliminating torque transferred by the tooth clutch of the inactive gear, the required disengagement force to be provided by the tooth clutch actuating mechanism is also decreased or substantially eliminated, thereby enabling proper disengaging the engaged inactive gear also in situations of high vehicle acceleration or deceleration. The solution thus prevents undesirable delays in gear changes, such that an improvement in terms of drivability of the powertrain is accomplished.

It is also desirable to provide a dual clutch transmission for vehicle where the previously mentioned problem is at least partly avoided.

According to an aspect of the present invention, a dual clutch transmission for a vehicle is provided comprising:

a plurality of gears, at least a transmission shaft carrying a gearwheel;

an output shaft carrying a further gearwheel in engagement with the gearwheel of the transmission shaft, a tooth clutch for selectively engaging and disengaging a gear composed of the gearwheels, the transmission shaft and the output shaft;

an electric motor drivingly connected to the transmission shaft; and an electronic control unit configured for, in a vehicle acceleration or retardation mode with an engaged active gear through which torque is transmitted between an engine and driven wheels, with an engaged inactive gear to be disengaged, and with the electric motor drivingly connected to a shaft of the inactive gear, controlling the electric motor to provide a compensational torque for temporarily decreasing or substantially eliminating torque transferred by the tooth clutch of the inactive gear, disengaging the engaged inactive gear.

According to some example embodiments of the disclosure, the method further comprises the step of calculating the compensational torque to be provided by the electric motor by using current acceleration or retardation level of the electric motor and at least a moment of inertia value of the electric motor. By calculating a compensational torque an appropriate torque may be immediately applied for enabling a rapid change of gear preselection.

According to some example embodiments of the disclosure, the method further comprises the step of calculating the compensational torque to be provided by the electric motor by using also current acceleration or retardation level of a transmission shaft drivingly connected to the electric motor and a moment of inertia value of said transmission shaft. Including also the moment of inertia of the transmission shaft provides a more accurate compensational torque.

According to some example embodiments of the disclosure, the method further comprises the step of calculating the compensational torque to be provided by the electric motor by using a total torque resulting from current acceleration or retardation level and moment of inertia value of each component rotationally connected to the tooth clutch of the engaged inactive gear and located upstream of said tooth clutch. Including the moment of inertia of each component provides a more accurate compensational torque.

According to some example embodiments of the disclosure, the method further comprises the step of calculating the compensational torque to be provided by the electric motor taking into account load-independent torque loss of said upstream components of said inactive gear. Including also the load-independent torque loss enables calculation of a more accurate compensational torque, in particular during cold transmission oil conditions.

According to some example embodiments of the disclosure, the method further comprises the step of determining said load-independent torque loss of said upstream components of the inactive gear takes current angular speed of the upstream components of the inactive gear into account. Including also the speed of the upstream components provides a more accurate compensational torque.

According to some example embodiments of the disclosure, the method further comprises the step of determining said load-independent torque loss of said inactive gear taking into account current transmission oil temperature. Including also transmission oil temperature provides a more accurate compensational torque.

According to some example embodiments of the disclosure, the method comprises acquiring current load-independent torque loss of said inactive gear from a data map. This approach enables a swift acquisition of data concerning current load-independent torque loss. It is also possible to update the data map if needed.

According to some example embodiments of the disclosure, the method comprises filling and/or replacing data of the data map with values by measuring load-independent torque loss of an inactive gear on an actual transmission specimen of the vehicle. This approach provides a very individual data map that takes variations within a set of dual clutch transmissions into account.

According to some example embodiments of the disclosure, the method further comprises the step of determining current acceleration or retardation level of the electric motor. This may be embodied by means of angular position sensor on the shaft of the electric motor.

According to some example embodiments of the disclosure, the method comprises controlling the electric motor to provide a gradually increasing compensational torque according to a predetermined sequence. This approach provides a non-complex and easily implementable solution for improving the disengagement of the tooth clutch using the electric motor.

According to some example embodiments of the disclosure, the gradually increasing compensational torque comprises a step-wise increasing compensational torque, or a linear or non-linear continuously increasing compensational torque. This approach enables the electric motor to provide the required output torque relatively swiftly and without knowledge of rotational speed and moment of inertia of any components of the dual clutch transmission.

According to some example embodiments of the disclosure, the step of disengaging the engaged inactive gear comprises controlling a tooth clutch actuating mechanism to apply disengagement force when an estimated and/or measured torque over the inactive gear is within a predetermined torque range, or when an estimated and/or measured torque over the inactive gear is substantially nil, or when a certain time has passed after the electric motor was controlled to provide the compensational torque, or before or simultaneous with controlling the electric motor to provide the compensational torque.

According to some example embodiments of the disclosure, the dual clutch transmission is free from a planetary transmission component in the transmission between the electric motor and combustion engine.

According to some example embodiments of the disclosure, the compensating torque is applied in the rotational direction of the electric motor during acceleration and opposite the rotational direction of the electric motor during deceleration.

According to some example embodiments of the disclosure, the method additionally comprises, after disengagement of the tooth clutch of the inactive gear, controlling the electric motor such that the relative speed between the rotating parts of a tooth clutch of a next inactive gear to be engaged is adapted for engagement. Using the electric motor for improving the synchronisation process of the next gear generally results in faster synchronisation and reduced wear on any mechanical synchronisation arrangement.

According to some example embodiments of the disclosure, a torque sensor is provided for measuring the torque of the output shaft of electric motor.

It is desirable to provide a computer program comprising program code means for performing the above-described method when said program is run on a computer, a computer readable medium carrying a computer program comprising program code means for performing the above-described method when said program product is run on a computer, an electronic control unit for controlling the electric motor of a dual clutch transmission where the electronic control unit being configured to perform the above-described method, as well as a corresponding dual clutch transmission for a vehicle, where the previously mentioned problem is at least partly avoided.

Further areas of applicability will become apparent from the description provided herein.

BRIEF DESCRIPTION OF DRAWINGS

In the detailed description below reference is made to the following figure, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiment, but are applicable on other variations of the disclosure.

Figure 1:
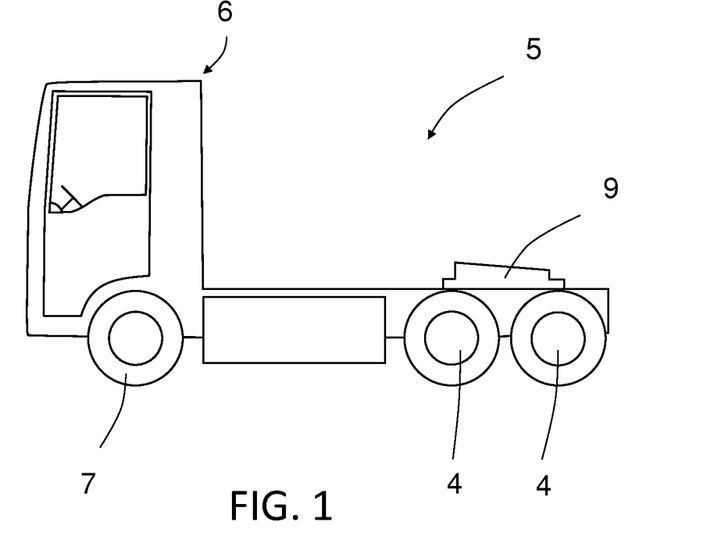
FIG. 1 shows schematically a vehicle suitable for having the disclosed method for disengaging an inactive gear of a dual clutch transmission, and corresponding transmission, implemented therein.

The disclosure concerns a method for controlling a dual clutch transmission, as well as the dual clutch transmission itself, for transmitting propulsion power from a power source to the driving wheels. With reference to FIG. 1 of the drawings, the dual clutch transmission may for example be included in a heavy or light truck 5 having a driver's cabin 6, a pair of front wheels 7, two pairs of rear wheels 4 which function as driving wheels, and coupling arrangement 9 for being connected to a trailer (not shown).

Figure 2:
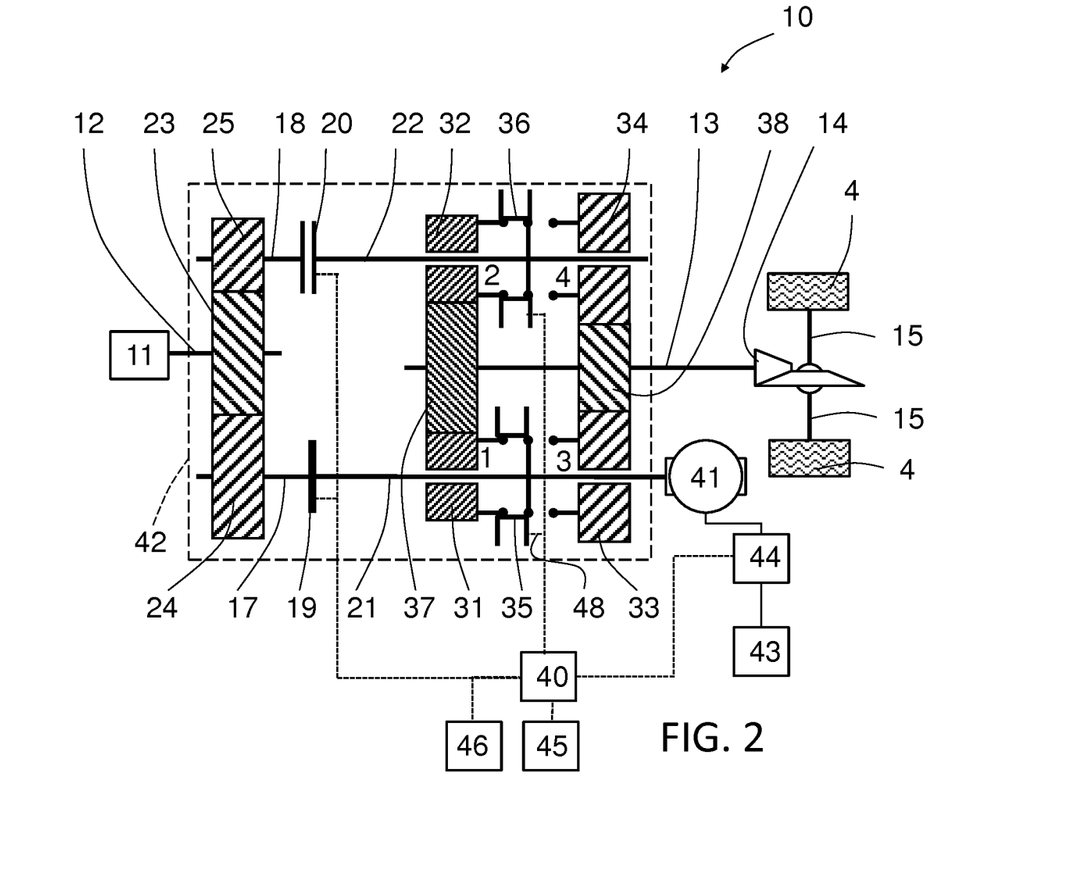
FIG. 2 shows schematically an example embodiment of a dual clutch transmission in a first operating mode.

FIG. 2 shows a schematic illustration of a simplified example embodiment of a dual clutch transmission 10 having only four forward gears 1,2,3,4 for the vehicle in FIG. 1. A power source 1, such as a combustion engine, is connected to a transmission input shaft 12 of the shown connected to the dual clutch transmission 10 and a transmission output shaft 13 of the dual clutch transmission 10 is drivingly connected to the rear wheels 4 via rear axle differential 14 and two drive shafts 15.

The dual clutch transmission 10 comprises a first friction clutch 19 and a second friction clutch 20 for selectively transmitting propulsion power via a first counter shaft 21 or a second counter shaft 22 respectively. The first and second friction clutches 19, 20 are controlled by means of an electronic control unit 40 to be alternatingly engaged, such that even gears 2, 4 of the dual clutch transmission 10 are associated with the second friction clutch 20, and odd gears 1, 3 of the dual clutch transmission 10 are associated with the first friction clutch 19.

A common input gear wheel 23 is rotationally fixed to the transmission input shaft 12. A first input gear wheel 24 meshes with the common input gear wheel 23 and is rotationally fixed to an input shaft 17 of the first friction clutch 19. A second input gear wheel 25 also meshes with the common input gear wheel 23 and is rotationally fixed to an input shaft 18 of the second friction clutch 20.

The first counter shaft 21 carries a first loose gearwheel 31 and a third loose gearwheel 33, and either the first and third loose gearwheels 31, 33 can be selectively rotationally locked to the first counter shaft 21 by means of a first tooth clutch 35. The second counter shaft 22 carries a second loose gearwheel 32 and a fourth loose gearwheel 34, and either the second or the fourth loose gearwheels 32, 34 can be selectively rotationally locked to the second counter shaft 22 by means of a second tooth clutch 36. The actuating position of the first and second tooth clutch 35, 36 is controlled by a tooth clutch actuating mechanism that is controlled by the electronic control unit 40.

The transmission output shaft 13 carries a first common output gearwheel 37 that is rotationally fixed to the transmission output shaft 13 and that meshes with both the first and second loose gearwheels 31, 32. The transmission output shaft 13 further carries a second common output gearwheel 38 that is rotationally fixed to the transmission output shaft 13 and that meshes with both the third and fourth loose gearwheels 33, 34.

An automatic or semi-automatic gear shift is carried out by the electronic control unit 40 controlling the engagement position of the first and second friction clutches 19, 20 and the actuating position of the first and second tooth clutches 35, 36 via the tooth clutch actuating mechanism.

An electric motor 41 is drivingly connected to the first counter shaft 21. The electric motor 41 may be a synchronous or asynchronous electric motor, and it may be used also an electric generator depending on the driving mode. The electric motor may be attached to an outer surface of a transmission housing 42 or being integrated within the housing 42. An electric storage system 43, such as a battery and/or a capacitor may be connected to the electric motor via conducting wires for either driving the electric motor with electric energy from the electric storage system, or generating electric energy by means of the electric motor 41 and storing the generated electric energy in the electric storage system 43. The combination of a power source 11, such as combustion engine, and the electric motor integrated with a shaft of the dual clutch transmission 10, provides a hybrid electric power train.

A power electronic unit 44 may be provided in the electric path between the electric motor 41 and electric storage system 43 for controlling the current and voltage levels. The power electronic unit 44 may receive instructions from the electronic control unit 40 for synchronizing the output torque of the electric motor 41 with the operating mode of the rest of the dual clutch transmission.

One example advantage of the dual clutch transmission is the possibility of providing a non-interrupted power transfer during a gear shifting sequence. By closing one friction clutch essentially simultaneously with the opening of the other friction clutch the non-interrupted power transfer is accomplished, while the first and second friction clutches provide a low fuel consumption due to omission of a hydraulic converter.

The functionality of the dual clutch transmission will be schematically illustrated and explained below with reference to FIGS. 2-5. In FIG. 2, the first friction clutch 19 is fully closed and transmits torque from the input shaft 17 of the first friction clutch 19 to the first counter shaft 21, and the second friction clutch 20 is opened.

Moreover, the first tooth clutch 35 is set in a position where it rotationally connects the first loose gearwheel 31 with the first counter shaft 21. This setting of the first tooth clutch 35 results in that the first gear is engaged, i.e. the gear with the lowest gear ratio between the transmission input shaft 12 and transmission output shaft 13. The second tooth clutch 36 is controlled to obtain a position where it rotationally connects the second loose gearwheel 32 with the second counter shaft 22. This setting of the first and second friction clutches 19, 20 and the first and second tooth clutches 35, 36 is typically used in a low speed driving mode and with the dual clutch transmission prepared for shifting gear from gear one, where the first loose gearwheel 31 transfers torque to the transmission output shaft 13 via the first friction clutch 19, to gear two, where the second loose gearwheel 32 transfers torque to the transmission output shaft 13 via the second friction clutch 20. In this control state of the dual clutch transmission 10 the first gear is an active gear, i.e. a gear transmitting propulsion torque from the power source 11 to the driving wheels 4, and the second gear is the engaged but inactive gear, i.e. a gear not transmitting propulsion torque from the power source 11 to the driving wheels 4.

Figure 3:
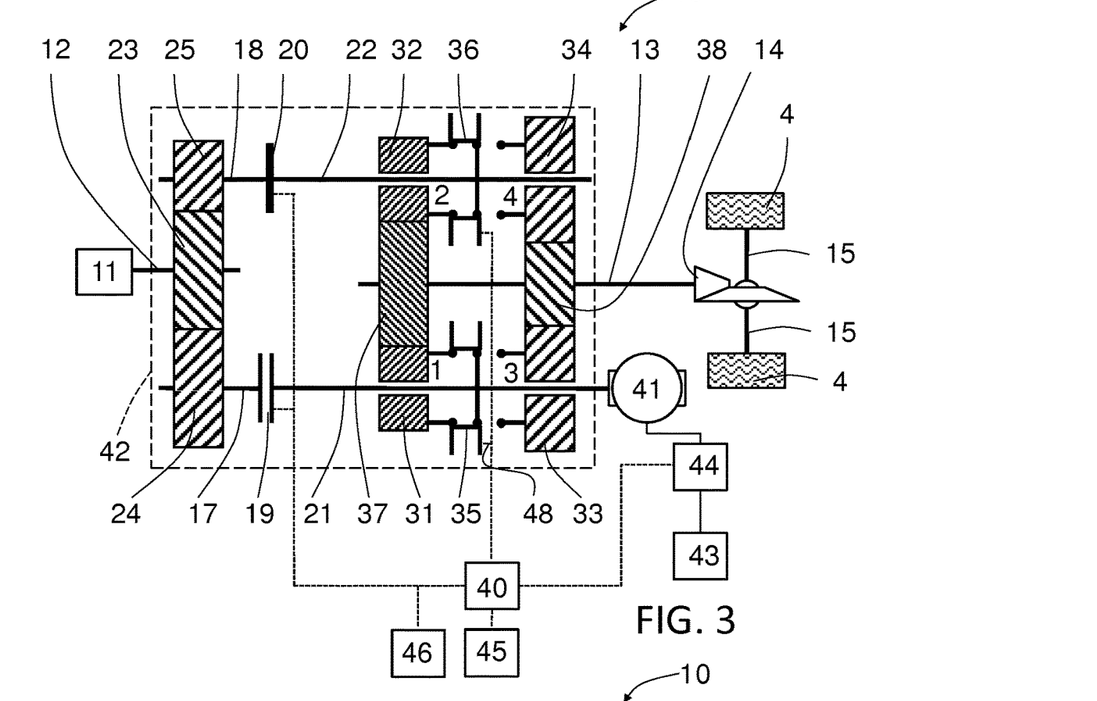
FIG. 3 shows the example embodiment of FIG. 2 in a second operating mode.

FIG. 3 shows the setting of the dual clutch transmission where the first friction clutch has become disengaged and the second friction clutch has become engaged. Thereby, the transmission has shifted gear from gear one to gear two. The actuating position of the first and second tooth clutches 35, 36 have so far not been changed because maybe the electronic control unit 40 decides to shift back to the first gear, for example due to desired reduced vehicle speed or desired sudden high level vehicle acceleration, as inputted to the electronic control unit 40 by receiving the output signal from a sensor 45 that indicates an actuating position of a driver's accelerator pedal. In this control state of the dual clutch transmission 10 the first gear is the engaged and inactive gear, i.e. a gear not transmitting propulsion torque from the power source 11 to the driving wheels 4, and the second gear is the engaged and active gear, i.e. a gear transmitting propulsion torque from the power source 11 to the driving wheels 4.

Figure 4:
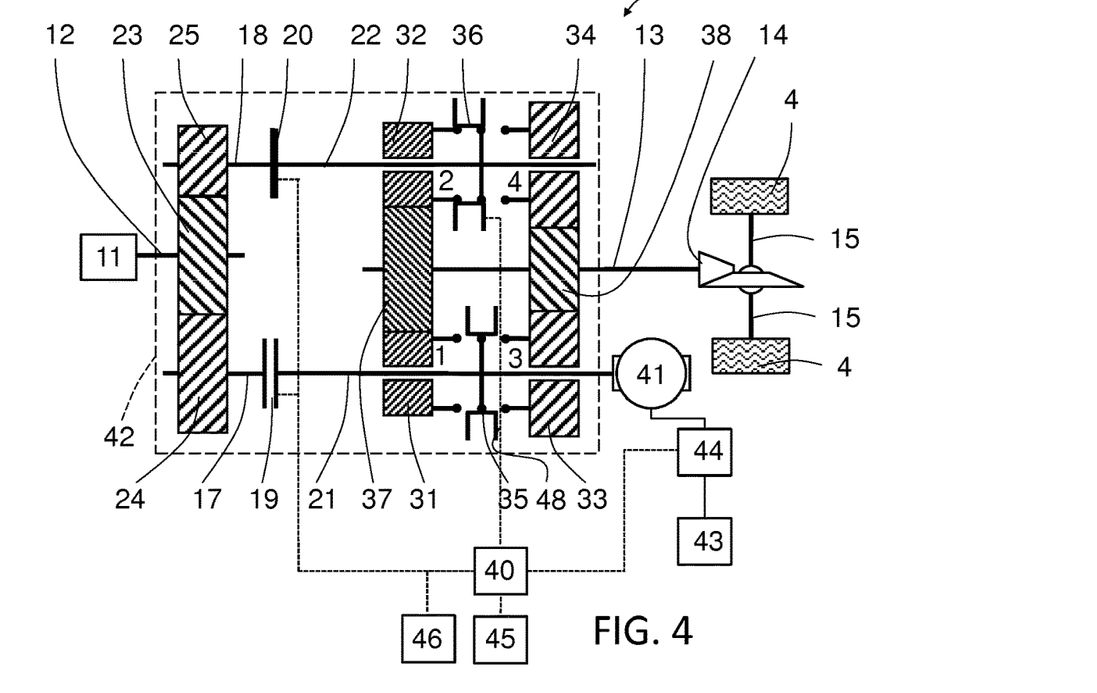
FIG. 4 shows the example embodiment of FIG. 2 in a third operating mode.
Figure 5:
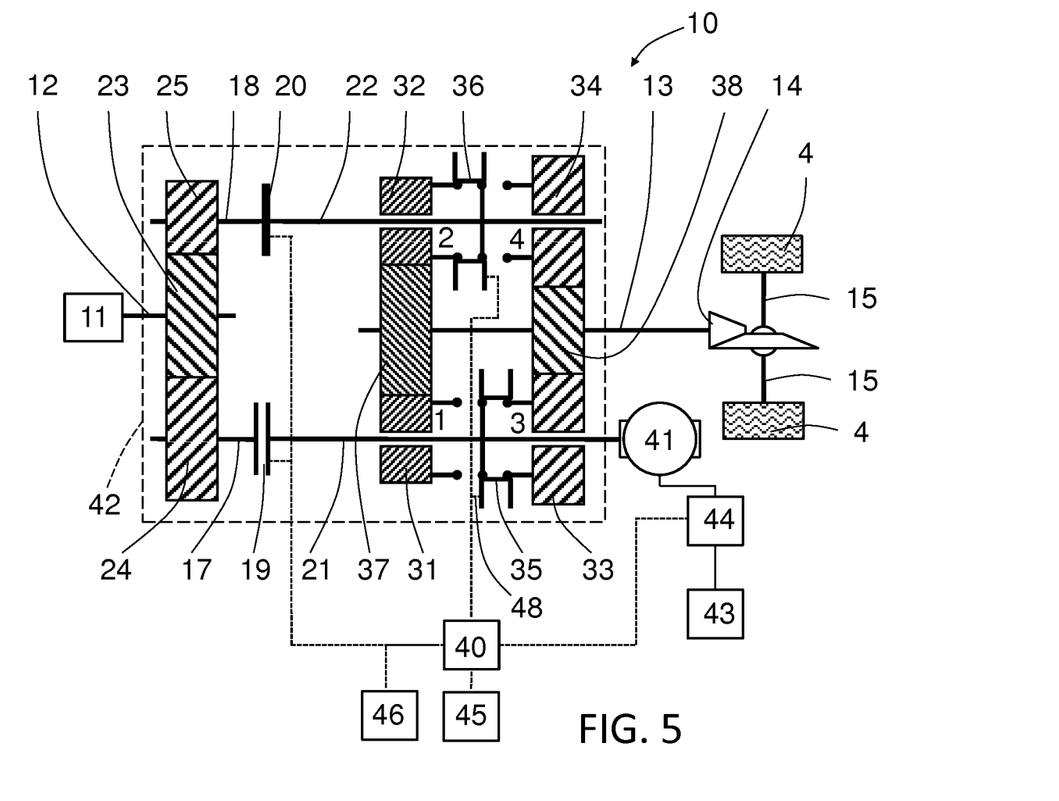
FIG. 5 shows the example embodiment of FIG. 2 in a fourth operating mode.

In FIG. 4 and FIG. 5, the step of shifting the inactive gear from gear one to gear three is shown. This shifting is performed by disengaging the currently engaged inactive gear and subsequently engaging the new inactive gear. Specifically, this shifting is performed by moving the first tooth clutch 35 such that the first loose gearwheel 31 becomes free to rotate relative the first countershaft 21 again, and subsequently instead rotationally fix the third loose gearwheel 33 to the first counter shaft 21. In FIG. 4, the tooth clutch 35 is moved to a position where both the first and third loose gearwheels 31, 33 are free to rotate relative the first countershaft 21, and in FIG. 5, the tooth clutch 35 has been moved even further such that the third loose gearwheel 33 has become engaged, i.e. rotationally fixed, with the first counter shaft 21. The first loose gearwheel 31 remains disengaged from the first countershaft 21. The engagement state of the first and second friction clutches 19, 20 is not changed. In the control state of the dual clutch transmission 10 as shown in FIG. 5, the second gear remains the engaged and active gear, but now gear three is the inactive gear. The dual clutch transmission 10 has consequently prepared itself for enabling a gear shift from gear two to gear three, which gear shift may be performed by merely disengaging the second friction clutch 20 and substantially simultaneously engaging the first friction clutch 19.

The electric motor 41 shown drivingly connected to the first counter shaft 21 of the dual clutch transmission in the example embodiment of FIG. 2-5, enables electric energy to be used for generating propulsion torque by the hybrid electric power train. The electrically generated propulsion torque may either be used as single power source or in combination with the internal combustion engine. The electric motor 41 may additionally or alternatively be used as an electric generator for braking the vehicle.

The electric motor 41 comprises a stationary stator and a rotatable rotor, which is drivingly connected to the shaft of the dual clutch transmission 10. The rotor has normally a relatively large mass, which may exceed the mass of the shaft to which it is connected. Consequently, the moment of inertia of the shaft and electric motor assembly may differ significantly from the moment of inertia of a corresponding shaft without an electric motor, depending on the size of the electric motor and shaft.

One consequence of a large moment of inertia of the shaft and electric motor assembly is increased torque requirement for changing speed of the assembly, since $T=J*\alpha$, where $T$ is torque, $J$ is moment of inertia and $\alpha$ is angular acceleration of the rotor. This phenomenon may in certain circumstances of elevated angular acceleration of the rotor prevent proper disengagement of a tooth clutch of an inactive gear of the dual clutch transmission due to the relatively large torque that is transferred by the tooth clutch that is currently transmitting torque to the shaft of the inactive gear, because the force needed to disengage a tooth clutch depends on the torque that is currently transferred by the tooth clutch. A high torque transfer level requires a high disengagement force for disengaging the tooth clutch. The elevated angular acceleration of the rotor may for example occur during times of relatively high level of vehicle acceleration and deceleration. An example of relatively high vehicle acceleration is acceleration using high level of engine power, in particular in combination with a low cargo weight and/or downhill road segment. An example of relatively high vehicle deceleration is relatively high level of vehicle braking or driving uphill a relatively steep road segment causing the vehicle to decelerate.

The disengagement of the inactive gear was illustrated and described with reference to FIGS. 3 and 4 above, where the first tooth clutch 35 on the inactive first gear has to be disengaged for subsequently engaging inactive third gear (In FIG. 5). If a vehicle exhibited an elevated acceleration and if the transmission was in a mode as shown in FIG. 3, the electronic control unit 40 would at a certain time control the first tooth clutch 35 to disengage the inactive first gear and subsequently control the first tooth clutch 35 to engage inactive third gear instead, for the purpose of preparing a future power shift from the second to the third gear. This specific driving situation may prevent the first tooth clutch 35 from being disengaged from the first inactive gear due to the relatively large torque that is transferred via the first tooth clutch 35 to the first counter shaft 21 for accelerating the shaft and rotor of the electric motor. As a result, the third inactive gear cannot be engaged and the planned powershift from the second to the third gear may be delayed, such that a temporary halt in vehicle acceleration will occur. This is undesirable because it creates reduced vehicle acceleration performance and overall disharmonic vehicle behaviour.

The present disclosure presents a solution to this particular problem. The solution comprises controlling the electric motor to provide a compensational torque for temporarily decreasing or substantially eliminating torque transferred by the tooth clutch of the inactive gear. When the torque transferred by the tooth clutch has decreased or been substantially eliminated, the engaged inactive gear may easily be disengaged. The present disclosure consequently provides a solution where the gear shifting problem incurred by the electric motor is actually solved by proper control of the electric motor.

Figure 6:
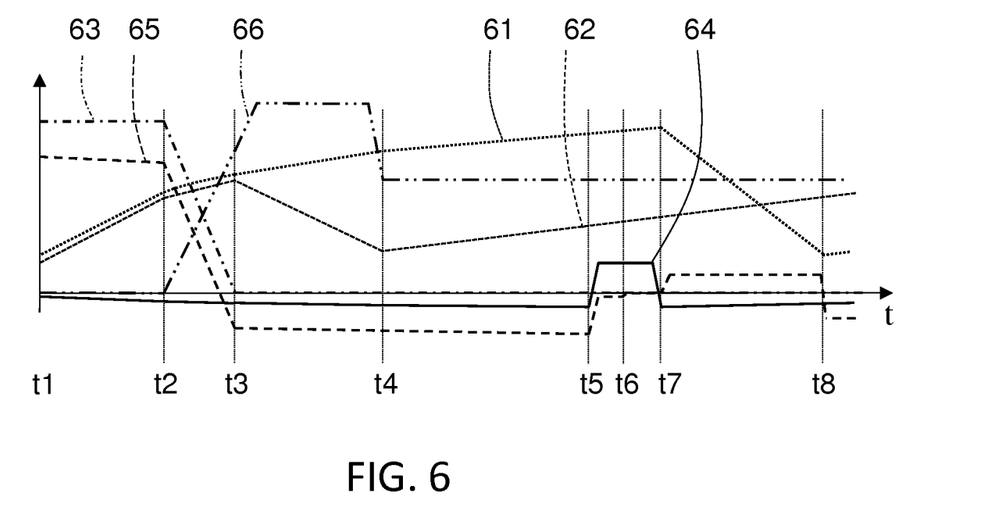
FIG. 6 shows a schematic representation of various parameters of an example embodiment dual clutch transmission during a power shift and subsequent change of preselected gear in an acceleration phase.

The gear shift sequence described above with reference to FIG. 2-FIG. 5 will now be described with reference to FIG. 6 in terms of rotational speed and torque of some components of the dual clutch transmission. For simplicity, it is assumed that the combustion engine 11 delivers a constant output torque. In FIG. 6 at time t1 the vehicle accelerates in the first gear, and the dual clutch transmission is in mode corresponding to FIG. 2 with the second gear being preselected. The internal combustion engine speed 62 increases, the first friction clutch 19 is engaged and the rotational speed 61 of the first counter shaft 21 increases proportionally. The torque 63 transmitted by the engaged first friction clutch 19 is constant and at a high level and the torque 66 transmitted by the disengaged second friction clutch 20 is zero. The torque 64 generated by the electric motor 41 caused by rotational friction and magnetic losses and is therefore negative. This torque has a relatively low level but is increasing due to increased rotational speed.

The torque 65 transmitted by the first tooth clutch 35 corresponds essentially to the torque 63 transmitted by the first friction clutch 19 minus the torque loss caused by accelerating the first counter shaft 21 and the electric motor 41 taking into account their moment of inertia, and the torque loss caused by rotational friction losses of first counter shaft 21 and the torque 64 caused by rotational friction and magnetic losses in the electric motor 41. This example relationship follows from the equation:

$$(J_{EM} + J_{CS1})\frac{d\omega}{dt} = M_{FC1} - M_{TC1} + M_{EM\_Drag} - M_{CS1\_Drag},$$

where $J_{EM}$ is moment of inertia of the electric motor 41, $J_{CS1}$ is moment of inertia of the entire first counter shaft 21, $d\omega/dt$ is current angular acceleration, $M_{FC1}$ is torque over the first friction clutch 19, $M_{TC1}$ is torque over the first tooth clutch 35, $M_{EM\_Drag}$ is torque loss caused by rotational friction and magnetic loss in the electric motor 41, and $M_{CS1\_Drag}$ is torque loss caused by rotational friction losses of the entire first counter shaft 21. This mathematical model of the torque relationship of the dual clutch transmission corresponds to one example embodiment and many variations may be made for accomplishing a more or less detailed and accurate mathematical representation.

The entire first counter shaft 21 refers to the shaft itself but also including any additional component rotationally connected thereto and which is also accelerated via the first tooth clutch 35, such as the gear wheels fastened to the shaft, part of the first friction clutch 19 that is connected to the first counter shaft 21, part of the first tooth clutch 35 that is rotationally fixed to the first counter shaft 21. In example embodiments of the dual clutch transmission having more gears, the entire first counter shaft 21 may additionally include gear wheels rotationally fixed to the shaft as well as other gear wheels meshing with said gear wheels. In fact, the term entire first counter shaft 21 herein refers to all components rotationally connected to the tooth clutch of the engaged inactive gear and which are located upstream of the gear wheel of the inactive gear, i.e. all components that are accelerated via torque transmitted via the first tooth clutch 35 during vehicle acceleration and with the first counter shaft 21 being inactive.

In the example embodiment of FIG. 3 all components rotationally connected to the tooth clutch of the engaged inactive gear and which is located upstream of the first loose gearwheel 31 of the inactive and preselected first gear are the following: The parts of the first tooth clutch 35 that are rotationally fixed to the first counter shaft 21, the parts of the first friction clutch 19 that are rotationally fixed to the first counter shaft 21, the rotor of the electric motor 41, and any parts of bearings rotationally fixed to any of said components.

At time t2 the electronic control unit 40 controls the first and second friction clutches 19, 20 to initiate a powershift from the first gear to the second gear. This involves substantially simultaneous disengagement of the first friction clutch 19 and engagement of the second friction clutch 20. Consequently, the torque 63 transmitted by the first friction clutch 19 begins to decrease towards zero and the torque 66 transmitted by the second friction clutch 20 begins to increase. Since the torque 65 transmitted by the first tooth clutch 35 corresponds essentially to the torque 63 transmitted by the first friction clutch 19 this torque begins to decrease also. The internal combustion engine speed 62 continues to increase and the rotational speed 61 of the first counter shaft 21 increases proportionally.

At time t3 the powershift is terminated and the gear shift is completed. The second friction clutch 20 is still slipping because the engine speed 62 is still much higher than the speed of the second counter shaft 22. The high torque transmitted by the second friction clutch 20 slowly adapts, i.e. decreases the engine speed 62 towards a speed where the input shaft 18 of the second friction clutch 20 is equal to the speed of the second counter shaft 22. The rotational speed 61 of the first counter shaft 21 continues to increase because the first tooth clutch 35 is still engaged and the first gear is still preselected. The torque 63 transmitted by the engaged first friction clutch 19 is now zero. The torque 65 transmitted by the first tooth clutch 35 corresponds essentially to the torque required for accelerating the first counter shaft 21 and rotor of the electric motor 41, as well as overcoming certain rotational friction and magnetic losses.

At time t4 the second friction clutch 20 has finally stopped slipping and the engine speed 62 begins to increase again but from a lower level. The rotational speed 61 of the first counter shaft 21 continues to increase because the first tooth clutch 35 is still engaged and the first gear is still preselected.

At time t5 the electronic control unit 40 initiates change of gear preselection of the inactive gear from the first gear to the third. This change corresponds to shifting engagement of the first tooth clutch from the first loose gearwheel 31 to the third loose gearwheel 33, as illustrated in the sequence of FIG. 3-FIG. 5. The torque 65 currently transmitted by the first tooth clutch 35 is however significant due to the relatively high current angular acceleration of the first counter shaft 21 and electric motor 41. The tooth clutch actuating mechanism may consequently be incapable of generating sufficient disengagement force for overcoming the frictional contact forces in the first tooth clutch 35 at this level of torque transfer. Therefore, the electronic control unit 40 controls the electric motor to provide a compensational torque 64 for temporarily substantially eliminating torque 65 transferred by the first tooth clutch 35.

At time t6 the torque 65 transferred by the first tooth clutch 35 is substantially zero and the first tooth clutch 35 is disengaged from the first loose gearwheel 31.

At about time t7, upon confirmation of said disengagement, the compensational torque 64 is cancelled and preselection of the third gear is initiated. The torque 64 generated by the electric motor 41 after time t7 is negative again, caused by rotational friction and magnetic losses, and the value corresponds to about the value at time t5 due to similar rotational speed.

At time t7, the rotational speed 61 of the first counter shaft 21 is much higher than the speed of the input shaft 17 of the first friction clutch 19, because the rotational speed 61 of the first counter shaft 21 was increased in the time period between t3-t4 when the speed of the input shaft 17 of the first friction clutch 19 significantly decreased due to the reduced engine speed 62. The relatively large deviation in relative speed is in the example embodiment of FIG. 6 eliminated by means of a conventional synchronisation arrangement (not showed).

The synchronisation arrangement may for example be embodied by an engagement surface on the first tooth clutch 35 engaging a corresponding engagement surface on the third loose gearwheel 33 for synchronising their relative rotational speed, and subsequently enabling the first tooth clutch 35 to engage the third loose gearwheel 33 for preselecting the third gear. Alternatively, a central synchronisation arrangement may be used.

At time t8 the rotational speed 61 of the first counter shaft 21 has become lower than the speed of the input shaft 17 of the first friction clutch 19 because the third gear is now preselected. The time period between time t7-t8 is a synchronisation period of the inactive gear. The negative torque 64 generated by the electric motor 41 decreases during the synchronisation period due to reduced rotational speed of the electric motor 41. The torque 65 transmitted by the first tooth clutch 35 during the synchronisation period is positive due to the supply of propulsion torque from the first counter shaft and electric motor 41 to the transmission output shaft 13 caused by the decreasing level rotational kinematic energy of the first counter shaft 21 and electric motor 41 as their rotational speed decreases. At time t8, the torque 65 transmitted by the first tooth clutch 35 becomes negative again when torque is required for increasing the rotational speed of the first counter shaft 21 and electric motor 41 again.

The electric motor 41 may additionally be used also for improving the synchronisation process during change of gear preselection. This is performed by actively controlling an output torque of the electric motor 41 during the synchronisation period for controlling the speed 61 of the first counter shaft 21 such that the relative speed between the rotating parts of the first tooth clutch 35 is adapted for engagement with third loose gearwheel 33. Such a control process is schematically illustrated in FIG. 7, which otherwise correspond exactly to the process described with reference to FIG. 6.

Figure 7:
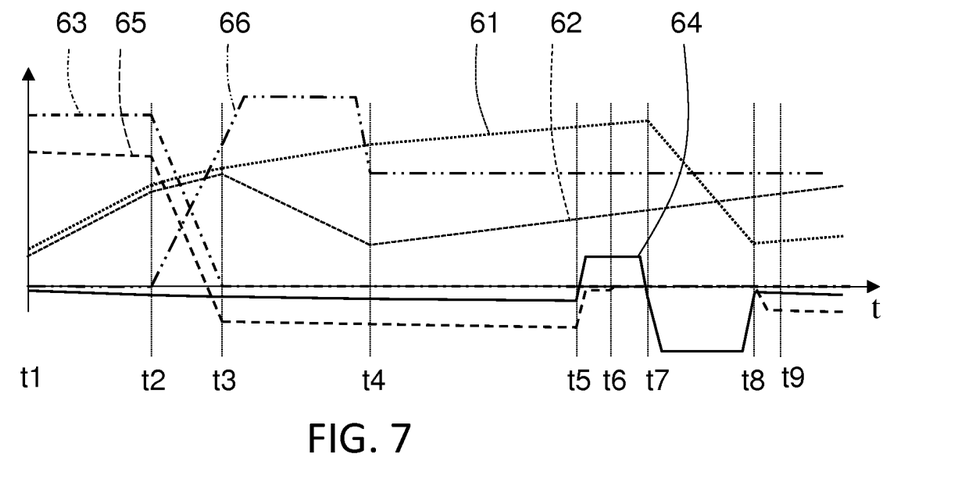
FIG. 7 shows a schematic representation of various parameters of an example embodiment dual clutch transmission similar to FIG. 6 but also applying the electric motor for synchronisation of next preselected gear.

In the synchronisation process shown in FIG. 7, the torque 64 generated by the electric motor 41 during the time t7-t8 results from a controlled negative output torque applied to the first counter shaft 21 for the purpose of quickly reducing the rotational speed 61 thereof. Thereby the relative speed between the rotating parts of the first tooth clutch 35 is quickly adapted for engagement with third loose gearwheel 33. This quick reduction in rotational speed 61 is illustrated by means of a relatively steep gradient of the rotational speed curve between time t7-t8 in FIG. 7. By using the electric motor 41 for controlling the speed of the first counter shaft 21 during the synchronisation process, no additional synchronisation means is required, or the need for additional mechanical synchronisation means is at least reduced. In FIG. 7, only the electric motor 41 is used for synchronising, such that the torque 65 transmitted by the first tooth clutch 35 is zero during the synchronisation process.

At time 18 the rotational speed 61 of the first counter shaft 21 has become lower than the speed of the input shaft 17 of the first friction clutch 19 and the third gear is preselected. The torque 65 transmitted by the first tooth clutch 35 is zero during the synchronisation process. The controlled negative output torque from the electric motor 41 is stopped, such that the torque 65 transmitted by the first tooth clutch 35 becomes negative again and at a value corresponding to the torque required for increasing the rotational speed of the first counter shaft 21 and electric motor 41 in line with the increase in engine rotational speed 62.

In FIG. 6 and FIG. 7 two alternative embodiments of the gear shift sequence described above with reference to FIG. 2-FIG. 5 were described for a vehicle acceleration phase. Now, with reference to FIG. 8 and FIG. 9, two similar alternative embodiments of the gear shift sequence will be described but during a vehicle deceleration phase. The deceleration sequence starts with the transmission mode as depicted in FIG. 5, i.e. with the second gear as active gear and the third gear being an inactive preselected gear.

Figure 8:
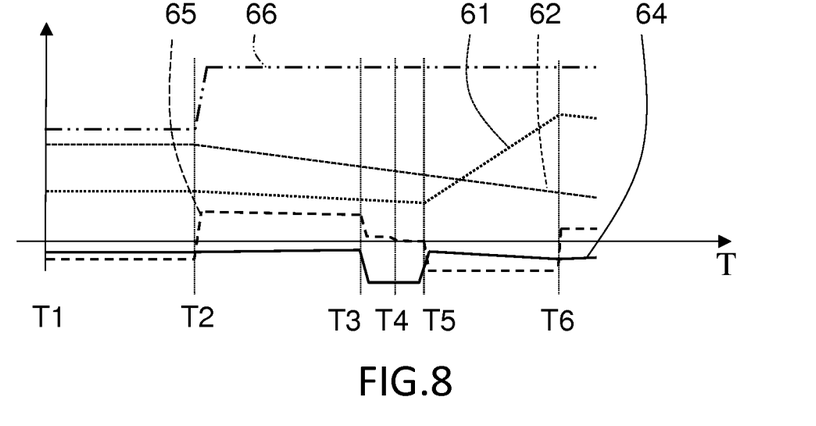
FIG. 8 shows a schematic representation of various parameters of an example embodiment dual clutch transmission during a power shift and subsequent change of preselected gear in a deceleration phase.

In FIG. 8 it is assumed that at time T1 the vehicle drives on a road segment without inclination. We assume that the second gear is active and that the third gear is preselected. The following parameters are all constant: the internal combustion engine speed 62, the rotational speed 61 of the first counter shaft 21, the torque 66 transmitted by the second friction clutch 20, the torque 64 generated by the electric motor 41 caused by rotational friction losses and the torque 65 transmitted by the first tooth clutch 35. The torque delivered by the combustion engine 11 is also constant.

At time T2 the vehicle enters a relatively steep uphill road segment. This event causes a sudden increase in torque 66 transmitted by the engaged second friction clutch 20 due to the sudden increase in propulsion load when the engine 11 tries to uphold the speed of the vehicle driving uphill. However, in the example of FIG. 8 the increased engine output is insufficient for maintaining a constant vehicle speed and the speed 62 of the engine consequently starts to decline. The rotational speed 61 of the first counter shaft 21 declines correspondingly due to the fixed rotational connection between the engine speed 61 and first counter shaft 21 as long as the first tooth clutch 35 is engaged with the third loose gearwheel, as shown in FIG. 5.

The torque 65 transmitted by the first tooth clutch 35 is increased at time T2 because of the relatively high current angular deceleration of the first counter shaft 21 and electric motor 40. The current angular deceleration of the first counter shaft 21 and electric motor 40 is higher than the natural deceleration incurred by the rotational friction and magnetic losses. The increase in torque 65 corresponds to the extra torque needed for decelerating the first counter shaft 21 and electric motor 41 with the current angular deceleration level.

At time T3 the electronic control unit 40 initiates change of gear preselection of the inactive gear from the third gear to the first gear. This change corresponds to shifting engagement of the first tooth clutch from the third loose gearwheel 33 to the first loose gearwheel 31, as illustrated in the sequence of FIG. 5-FIG. 3. The torque 65 transmitted by the first tooth clutch 35 at time T3 is however significant due to the relatively high current angular deceleration of the first counter shaft 21 and electric motor 40. The tooth clutch actuating mechanism may consequently be incapable of generating sufficient disengagement force for overcoming the frictional contact forces in the first tooth clutch 35 at this level of torque transfer. Therefore, the electronic control unit 40 controls the electric motor 41 to provide a compensational torque 64 for temporarily substantially eliminating torque 65 transferred by the first tooth clutch 35.

At time T4 the torque 65 transferred by the first tooth clutch 35 is substantially zero and the first tooth clutch 35 is disengaged from the third loose gearwheel 33. As soon as the first tooth clutch 35 is disengaged the torque 65 transferred by the first tooth clutch 35 becomes exactly zero. The negative compensational torque from the electric motor 41 will however cause the rotational speed 61 of the first counter shaft 21 to keep decelerating at about the same level as before.

At about time T5, upon confirmation of said disengagement, the compensational torque 64 is cancelled and preselection of the first gear is initiated. The torque 64 generated by the electric motor 41 after time T5 is caused by rotational friction and magnetic losses and is dependent on the speed 61 of the first counter shaft 21. At time T5, the rotational speed 61 of the first counter shaft 21 is much lower than the speed of the input shaft 17 of the first friction clutch 19, because the rotational speed 61 of the first counter shaft 21 was decreased in the time period between T2-T4 when the speed of the input shaft 17 of the first friction clutch 19 significantly decreased due to the reduced engine speed 62. The relatively large deviation in relative speed is the example embodiment of FIG. 8 eliminated by means of a conventional mechanical synchronisation arrangement (not showed).

The mechanical synchronisation arrangement may for example be embodied by an engagement surface on the first tooth clutch 35 engaging a corresponding engagement surface on the first loose gearwheel 31 for synchronising their relative rotational speed, and subsequently enabling the first tooth clutch 35 to engage the first loose gearwheel 31 for preselecting the first gear. Alternatively, a central mechanical synchronisation arrangement may be used.

At time T6 the rotational speed 61 of the first counter shaft 21 has become larger than the speed of the input shaft 17 of the first friction clutch 19 and the first gear becomes preselected by engagement of the first tooth clutch 35 with the first loose gearwheel 31. The time period between time T5-T6 is a synchronisation period of the inactive gear to become engaged. The torque 65 transmitted by the first tooth clutch 35 during the synchronisation period is negative due to the need of torque from the combustion engine for speeding up the rotational speed 61 of the first counter shaft 21. At time T6, the torque 65 transmitted by the first tooth clutch 35 becomes positive again due to the supply of propulsion torque from the first counter shaft and electric motor 41 to the transmission output shaft 13 caused by the decreasing level of rotational kinematic energy of the first counter shaft and electric motor 40 as their rotational speed decreases faster than their natural deceleration level that is incurred merely by their rotational friction and magnetic losses.

The electric motor 41 may additionally be used also for improving the synchronisation process during change of gear preselection also during vehicle deceleration. This is performed by actively controlling an output torque of the electric motor 41 during the synchronisation period for controlling the speed 61 of the first counter shaft 21 such that the relative speed between the rotating parts of the first tooth clutch 35 is adapted for engagement with first loose gearwheel 31. Such a control process is schematically illustrated in FIG. 9, which otherwise correspond exactly to the process described with reference to FIG. 8.

Figure 9:
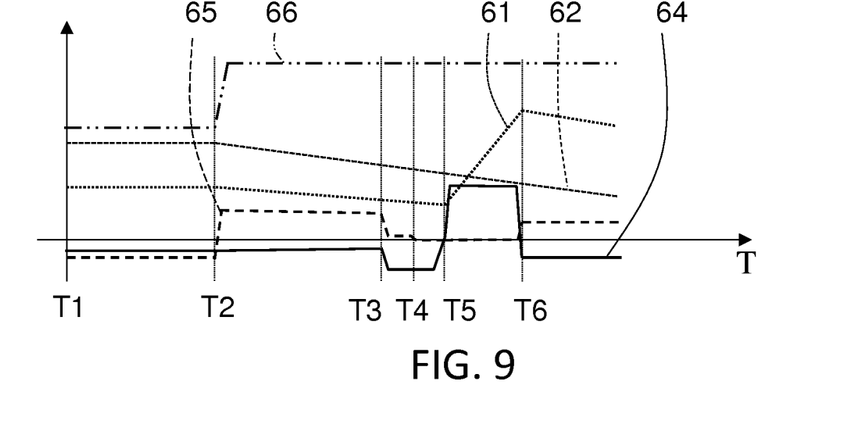
FIG. 9 shows a schematic representation of various parameters of an example embodiment dual clutch transmission similar to FIG. 8 but also applying the electric motor for synchronisation of next preselected gear.

In the synchronisation process shown in FIG. 9, the torque 64 generated by the electric motor 41 during the time T5-T6 results from a controlled positive output torque applied to the first counter shaft 21 for the purpose of quickly increasing the rotational speed 61 thereof. Thereby the relative speed between the rotating parts of the first tooth clutch 35 is quickly adapted for engagement with first loose gearwheel 31. This quick increase in rotational speed 61 is illustrated by means of a relatively steep gradient of the rotational speed curve between time T5-T6 in FIG. 9. By using the electric motor 41 for controlling the speed of the first counter shaft 21 during the synchronisation process, no additional synchronisation means is required, or the need for additional mechanical synchronisation means is at least reduced. In FIG. 9, only the electric motor 41 is used for synchronising, such that the torque 65 transmitted by the first tooth clutch 35 is zero during the synchronisation process.

At time T6 the rotational speed 61 of the first counter shaft 21 has become larger than the speed of the input shaft 17 of the first friction clutch 19 and the first gear becomes preselected by engagement of the first tooth clutch 35 with the first loose gearwheel 31. The torque 65 transmitted by the first tooth clutch 35 is zero during the synchronisation process. At time T6 the controlled negative output torque from the electric motor 41 is stopped, such that the torque 65 transmitted by the first tooth clutch 35 becomes positive again and at a value corresponding to the torque required for decreasing the rotational speed of the first counter shaft 21 and electric motor 41 in line with the decrease in engine rotational speed 62.

Figure 10:
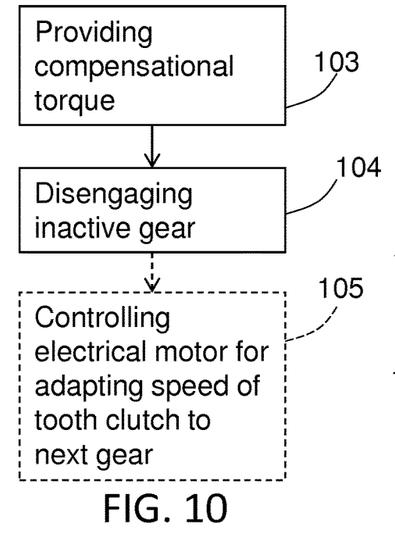
FIG. 10 shows an example embodiment of the method for disengaging an inactive gear of a dual clutch transmission.

The method for disengaging a tooth clutch of an inactive gear in a dual clutch transmission 10 during vehicle acceleration or retardation may be schematically described with reference to FIG. 10, which shows a flow chart with the main steps of the method. The dual clutch transmission 10 comprising an engaged active gear through which torque is transmitted between an engine 11 and driven wheels 4, an engaged inactive gear to be disengaged, and an electric motor 41 drivingly connected to a shaft 21 of the inactive gear. The method comprises a step 103 of controlling the electric motor 41 to provide a compensational torque for temporarily decreasing or substantially eliminating torque transferred by the tooth clutch 35 of the inactive gear, and a subsequent step 104 of disengaging the engaged inactive gear. An optional further step 105 of controlling the electric motor 41 for adapting the speed of the tooth clutch 35 to the next gear may be included for improved synchronisation process of the new preselected gear.

The means for determining a suitable level of compensational torque to be provided, and the manner in which the compensational torque is provided over time can vary according to many different objectives, and many different example embodiments for performing this are possible. For example, the electric motor may be controlled to provide a gradually increasing compensational torque according to a predetermined sequence. This gradually increasing compensational torque may for example comprise a step-wise increasing compensational torque, or a linear or non-linear continuously increasing compensational torque. Also other types of predetermined sequences for providing a compensational torque are possible. For example, one straightforward example is to read the output signal of a torque sensor provided for measuring the torque of the output shaft of electric motor or a representative component by means of a torque sensor, and to control the compensational torque based on the output signal.

Figure 11:
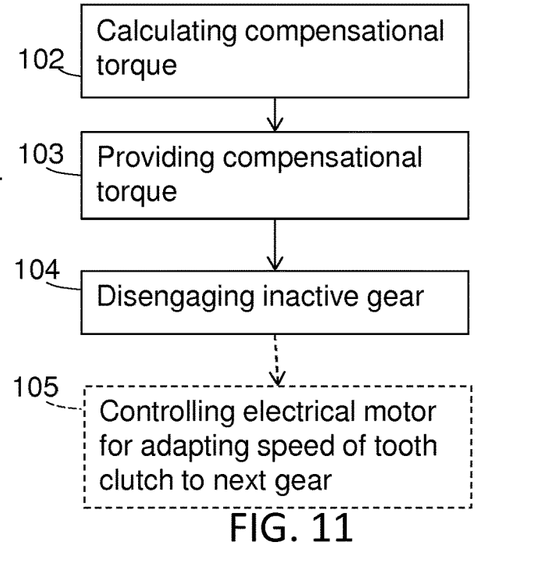
FIG. 11 shows a first alternative example embodiment of the method for disengaging an inactive gear of a dual clutch transmission.

Still more alternatively and with reference to FIG. 11, the step 103 of providing a compensational torque may be preceded with a step 102 of calculating the compensational torque to be provided by the electric motor 41.

The calculation of the compensational torque to be provided by the electric motor 41 may be carried out in several alternative manners. For example, with reference to FIG. 12, the step 102 of calculating the compensational torque to be provided by the electric motor 41 may be preceded with a step 101 of determining an acceleration or retardation level of the electric motor 41 or a shaft directly or indirectly rotationally connected to the electric motor 41. When the acceleration or retardation level of the electric motor 41 or a shaft directly or indirectly rotationally connected to the electric motor 41 is known, a reasonable value for a suitable compensational torque may be calculated using the current acceleration or retardation level of the electric motor 41 and at least a moment of inertia value of the electric motor 41. Since the moment of inertia in many cases will by far exceed the moment of inertia of the associated counter shaft the moment of inertia of the electric motor 41 may be sufficient for calculating a reasonable compensational torque.

However, in case a more accurate value of a suitable compensational torque is desired, and/or of the moment of inertia of the electric motor 41 does not by far exceed the moment of inertia of the associated counter shaft, the step 102 of calculating the compensational torque to be provided by the electric motor may involve use of also the current acceleration or retardation level of a transmission shaft drivingly connected to the electric motor and a moment of inertia value of said transmission shaft.

The step of calculating the compensational torque to be provided by the electric motor may additionally be based on current acceleration or retardation level and moment of inertia value of each component rotationally connected to the tooth clutch of the engaged inactive gear and located upstream of a gear wheel of the inactive gear. Thereby each and every component influencing the torque transferred by the tooth clutch at time t6 and T4 in FIGS. 6 and 8 respectively may be determined with high accuracy.

Figures 12, 13:
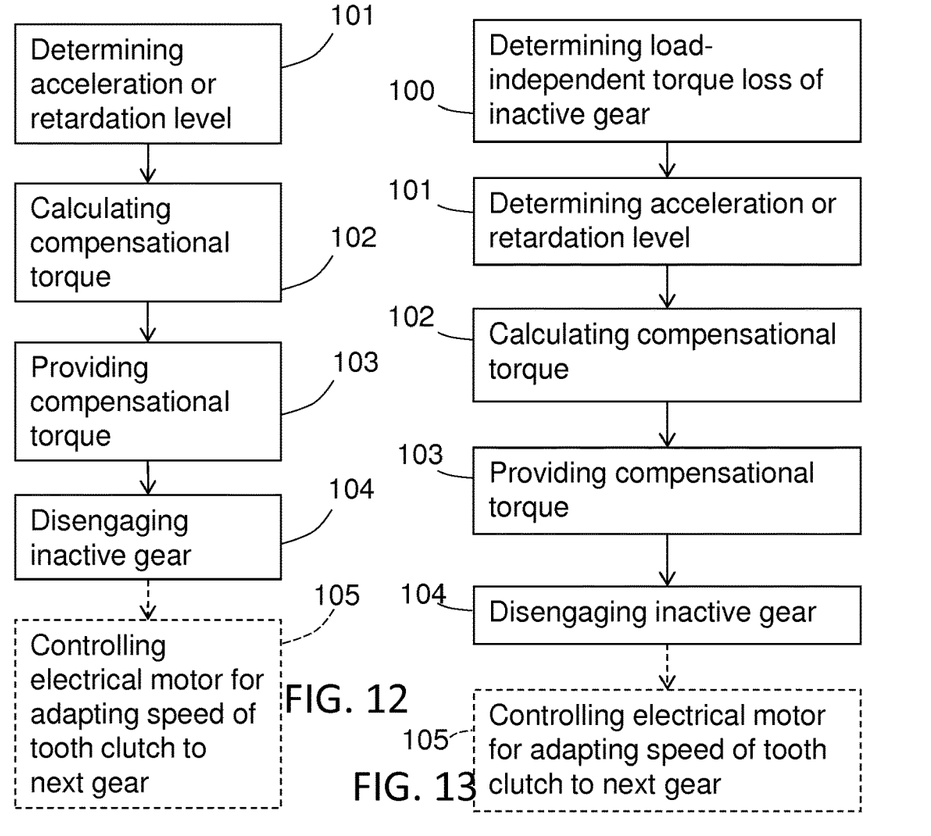
FIG. 12 shows a second alternative example embodiment of the method for disengaging an inactive gear of a dual clutch transmission.
FIG. 13 shows a third alternative example embodiment of the method for disengaging an inactive gear of a dual clutch transmission.

With reference to FIG. 13, the step 101 of determining acceleration or retardation level may be preceded with the step 100 of determining load-independent torque loss of the rotating parts upstream of the tooth clutch to be disengaged of the inactive gear. Calculating the compensational torque to be provided by the electric motor and additionally taking load-independent torque loss of said inactive gear into account provides a more accurate estimate of a proper compensational torque. Load-independent torque loss herein refers for example to torque loss resulting from rotational frictional losses in bearings and due to interaction between the rotational components and lubrication oil within the dual clutch transmission. Taking also the load-independent torque loss of said rotating parts of the inactive gear into account enables the calculation of an even more accurate compensational torque.

Since for the example the rotational friction loss depends on the angular speed, it may be advantageous also taking into account current angular speed of the components of the inactive gear for determining said load-independent torque loss of said rotating parts of the inactive gear.

Moreover, since for the example the rotational friction loss depends on the transmission oil temperature, it may be advantageous also taking into account current transmission oil temperature for determining said load-independent torque loss of said rotating parts of the inactive gear.

Still more alternatively, the current load-independent torque loss of said inactive gear may simply be collected from a data map 46. The data of the map 46 itself may be filled and/or replaced with values obtained by measuring load-independent torque loss of an inactive gear on an actual transmission specimen of the vehicle. This may for example be performed by allowing a shaft to decelerate freely from a high rotational speed and registering the angular deceleration. This may be then also be performed for different transmission oil temperatures for mapping also the load-independent torque loss based on oil temperature. The load-independent torque loss of the electric motor may be determined by measuring free deceleration of the first counter shaft and electric motor assembly and comparing this with the load-independent torque loss of the shaft having the electric motor disconnected from the shaft.

The data of a map 46 may either be produced/replaced individually in each dual clutch transmission, preferably based on a general data map 46. Alternatively, the data of the map 46 may be produced by measuring on one test specimen, and that map 46 may subsequently be used on all produced transmissions with no replacement of the data.

So far the disclosure has included a single example layout embodiment of the dual clutch transmission 10, as shown in FIG. 2-5. However, many variations of the layout of the dual clutch transmission 10 are possible.

Figure 14:
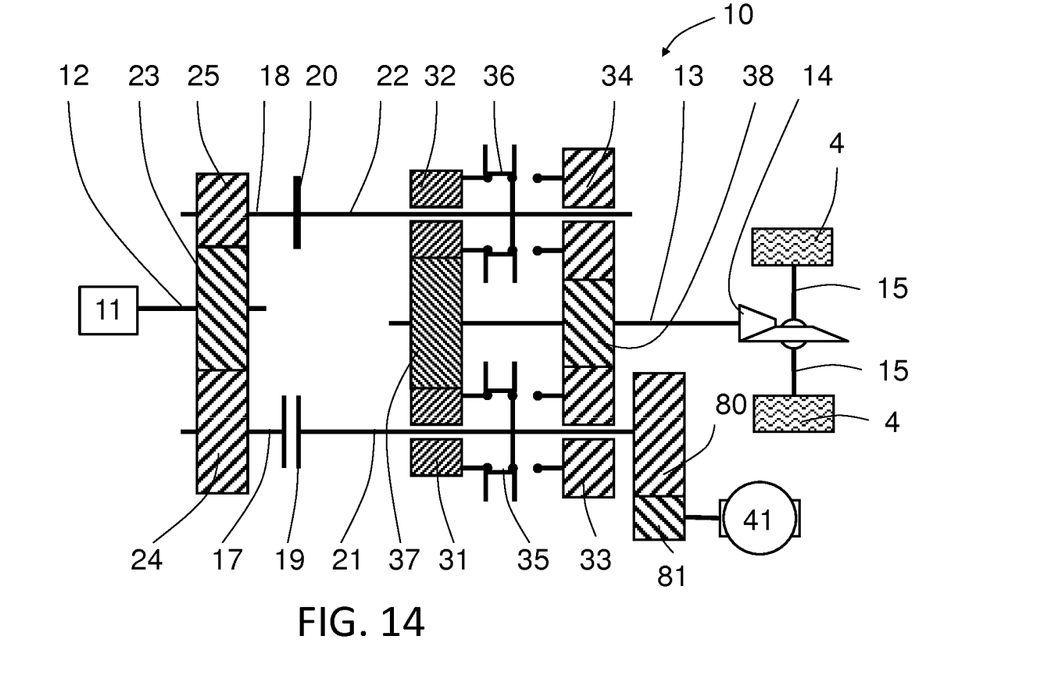
FIG. 14 shows schematically an alternative example embodiment of a dual clutch transmission.

For example, one alternative example embodiment of the dual clutch transmission layout is schematically shown in FIG. 14. Here, the only difference concerns the rotational connection of the electric motor 41 to the first counter shaft 21. Instead of directly connecting the electric motor 41 to the first counter shaft 21 as shown in FIG. 2-5 the electric motor 41 is connected to the first counter shaft 21 via an intermediate gearing, which comprises a first gearwheel 81 connected to a shaft of the electric motor 41 and a second gearwheel 80 rotationally fastened to the first counter shaft 21 and meshed with the first gearwheel 81. In this example the first counter shaft 21 and the electric motor 41 may have different rotational speeds, which should preferably be taken into account when calculating the compensational torque based on moment of inertia of the first counter shaft 21 and electric motor 41.

Figure 15:
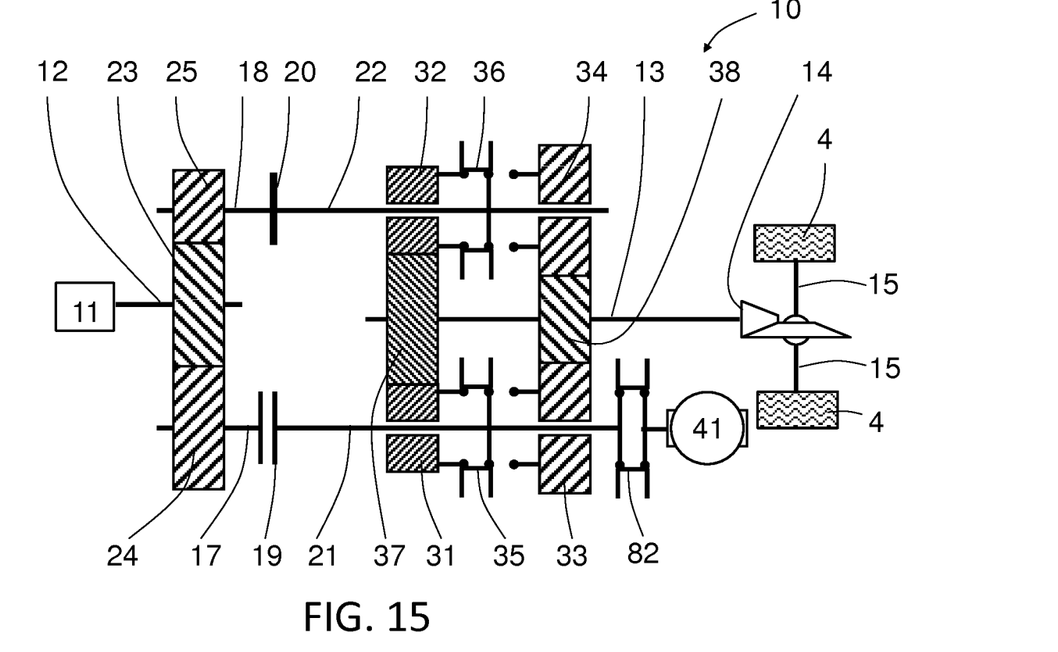
FIG. 15 shows schematically a further alternative example embodiment of a dual clutch transmission.

Still one alternative example embodiment of the dual clutch transmission layout is schematically shown in FIG. 15. Here, the electric motor 41 is connected to the first counter shaft 21 via an additional clutch 82, such as a tooth clutch or a frictional clutch. Thereby the electric motor 41 can be disconnected from the first counter shaft 21 for longer or shorter time periods. Disengagement of the electric motor 41 results in elimination of rotational friction and magnetic losses in the electric motor 41. Engagement of the electric motor enables fuel-efficiency improvements by using the electric motor 41 as an additional propulsion source and/or regeneration of braking energy.

The inventive concept of controlling the electric motor 41 to provide a compensational torque for temporarily decreasing or substantially eliminating torque transferred by the tooth clutch 35 of the inactive gear enables reliable operation of the first tooth clutch 35 during disengagement of any engaged inactive gear also during phases of relatively high acceleration and deceleration. The inventive concept thus also enables use of a relatively slow but cost-efficient tooth clutch as additional clutch 82, because there is no need for disconnecting the electric motor 41 prior to operation of the first tooth clutch 35 in a disengagement process of any engaged inactive gear.

Furthermore, in particular when a tooth clutch is used as additional clutch 82, but also when a friction clutch is used as additional clutch 82, the electric motor 41 may advantageously be controlled to synchronise the speed of the electric motor 41 with the speed of the first counter shaft 21 prior to engagement of the additional clutch 82. Thereby, the engagement process of the additional clutch 82 is simplified.

Still furthermore, in particular when a tooth clutch is used as additional clutch 82, the electric motor 41 may advantageously be controlled to provide a compensational torque for temporarily decreasing or substantially eliminating torque transferred by the additional tooth clutch 82 for simplifying reliable disengagement of the additional tooth clutch during phases of relatively high acceleration and deceleration. It may prove problematic to disengage a tooth clutch that transfers a certain level of torque, and by application of the compensational torque, the disengagement of the additional clutch 82 may be simplified.

Figure 16:
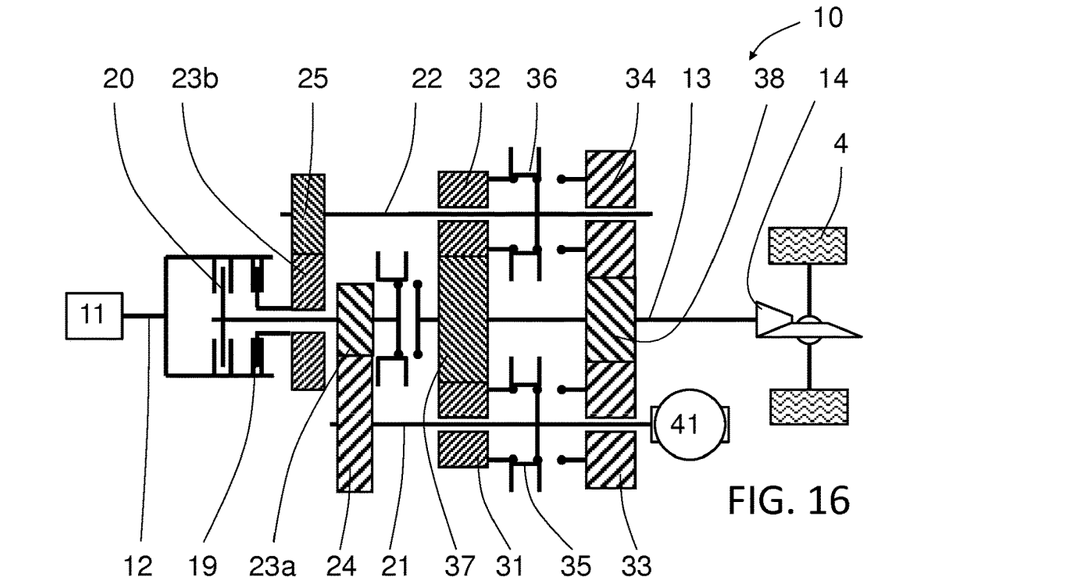
FIG. 16 shows schematically still a further example embodiment of a dual clutch transmission.

Still one alternative example embodiment of the dual clutch transmission layout is schematically shown in FIG. 16. Here, the first and second friction clutches 19, 20 are arranged coaxially, wherein each friction clutch 19, 20 is connected to an individual input gear wheel 23a, 23b, wherein a first input gear wheel 23a meshes with the first input gear wheel 24, and wherein a second input gear wheel 23b meshes with the second input gear wheel 25. The first and second counter shafts 21, 22 are here arranged parallel but not coaxial. The electric motor 41 is connected to the first counter shaft 21.

Figure 17:
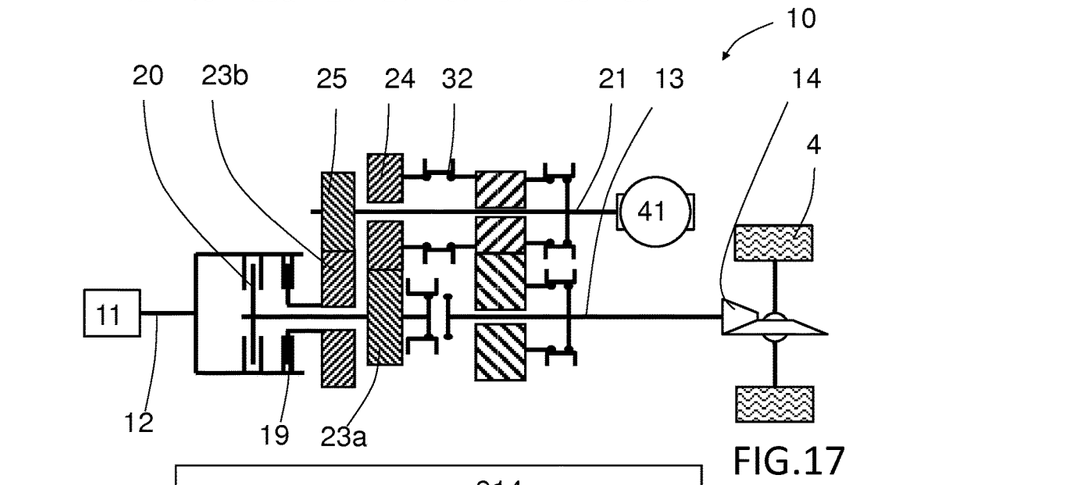
FIG. 17 shows schematically yet a further example embodiment of a dual clutch transmission.

Still one alternative example embodiment of the dual clutch transmission layout is schematically shown in FIG. 17. Here, the first and second friction clutches 19, 20 are arranged coaxially, wherein each friction clutch 19, 20 is connected to an individual input gear wheel 23a, 23b, wherein a first input gear wheel 23a meshes with the first input gear wheel 24, and wherein a second input gear wheel 23b meshes with the second input gear wheel 25. This example layout comprises a single counter shaft 21, and the first and second input gear wheels 24, 25 are arranged coaxially, wherein the first input gearwheel 24 is a loose gearwheel. The electric motor 41 is connected to the single counter shaft 21.

Many further example layouts of the dual clutch are possible within the concept of the present disclosure, in particular more complex transmission layouts with more forward gears and at least one rearward gear. The example embodiments of FIGS. 2-5 and 14-17 are merely schematic simplified examples of the transmission layouts for simplifying understanding of the underlying functionality of the disengagement of the tooth clutch using a compensational torque from the electric motor. For example, the inventive concept of this disclosure may advantageously be applied when an electric motor is connected to the countershaft 13a or 13c in DE102008051989A1.

The dual clutch transmission is free from a planetary transmission component in the transmission between the electric motor and combustion engine for avoiding unnecessarily complex gearing.

Figure 18:
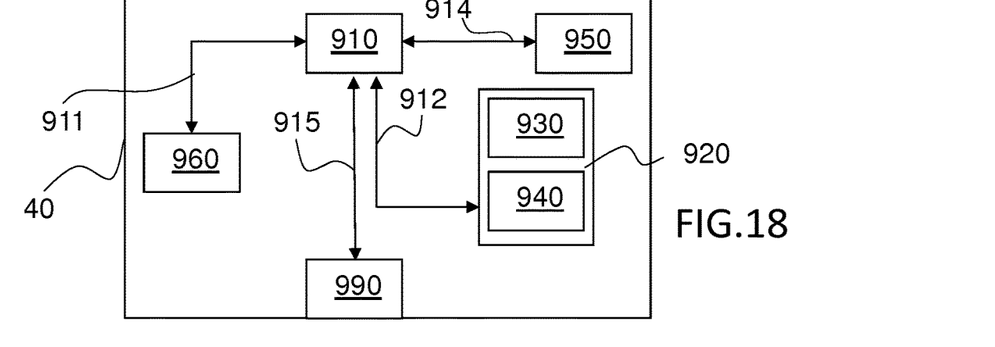
FIG. 18 shows schematically an example embodiment of an electronic control unit for controlling the dual clutch transmission.

The present invention also relates to a computer program, a computer readable medium carrying a computer program and an electronic control unit 40 for controlling the dual clutch transmission 10. FIG. 18 shows an example layout of an electronic control unit 40 comprising a non-volatile memory 920, a data processing unit 910 and a read and write memory 960. The data processing unit 910 may for example be a microprocessor.

The memory 920 may have a first memory part 930 and a second memory part 940. The first memory part 930 may have a computer program for controlling the dual clutch transmission 10 stored therein. The computer program in the memory part 930 for controlling the dual clutch transmission 10 can be an operating system. The second memory part 940 may have a program for performing the method of the claims stored therein. In an alternative embodiment, the program for performing the method of the claims may be stored in a separate non-volatile storage medium 950 for data, such as, for example, a CD or an exchangeable semiconductor memory. The program can be stored in an executable form or in a compressed state. When it is stated below that the data-processing unit 910 runs a specific function, it should be clear that the data-processing unit 910 is running a specific part of the program stored in the second memory part 940 or a specific part of the program stored in the non-volatile storage medium 950.

The data-processing unit 910 is tailored for communication with the storage medium 950 through a data bus 914. The data-processing unit 910 is also tailored for communication with the memory 920 through a data bus 912. In addition, the data-processing unit 910 is tailored for communication with the read and write memory 960 through a data bus 911. The data-processing unit 910 is also tailored for communication with a data port 990 by the use of a data bus 915. The method according to the present invention can be executed by the data-processing unit 910, by the data-processing unit running the program stored in the memory 940 or the program stored in the non-volatile storage medium 950.

The example schematic layout of an electronic control unit 40 merely represents one single example embodiment of an electronic control unit 40 and a person skilled in the art would understand that many variations in the layout are possible within the scope of the claims.

Reference signs mentioned in the claims should not be seen as limiting the extent of the matter protected by the claims, and their sole function is to make claims easier to understand.

The term inactive shaft herein refers to a transmission shaft that is connected to the dual clutch but which is currently disconnected from the main propulsion engine due to an open clutch, and term active shaft herein refers to a transmission shaft this that is connected to the dual clutch but which is currently drivingly connected to the main propulsion engine due to a closed clutch.

The invention claimed is:

1. A method for shifting from a first gear to a second gear in a dual clutch transmission during vehicle acceleration or retardation, the dual clutch transmission comprising:

the first gear which is engaged and active such that torque is transmitted between an engine and driven wheels there through, the first gear being disconnectable from the engine by a first friction clutch, the first friction clutch being closed, the second gear to be engaged, which is disengaged and inactive such that no torque is transmitted between the engine and the driven wheels there through, the second gear being disconnectable from the engine by a second friction clutch, the second friction clutch being open, an electric motor drivingly connected to a shaft of the one of the first gear or the second gear which is inactive, the method comprising:

engaging the second gear to become an engaged inactive gear, essentially simultaneously opening the first friction clutch and closing the second friction clutch such that engine torque is transmitted to the driven wheels through the second gear, thereby the first gear becomes engaged and inactive and the second gear becomes engaged and active, controlling the electric motor to provide a compensational torque for temporarily decreasing or substantially eliminating torque transferred by a tooth clutch of the inactive gear, disengaging the first gear by disengaging the tooth clutch such that the first gear thereby becomes disengaged and inactive.

2. The method according to claim 1, comprising calculating the compensational torque to be provided by the electric motor by using current acceleration or retardation level of the electric motor and at least a moment of inertia value of the electric motor.

3. The method according to claim 2, comprising calculating the compensational torque to be provided by the electric motor by using also current acceleration or retardation level of a transmission shaft drivingly connected to the electric motor and a moment of inertia value of the transmission shaft.

4. The method according to claim 1, comprising calculating the compensational torque to be provided by the electric motor by using a total torque resulting from current acceleration or retardation level and moment of inertia value of each component rotationally connected to the tooth clutch of the engaged inactive gear and located upstream of a gear wheel of the inactive gear.

5. The method according to claim 1, comprising calculating the compensational torque to be provided by the electric motor taking into account load-independent torque loss of components rotationally connected to the tooth clutch of the inactive gear.

6. The method according to claim 5, comprising determining a load-independent torque loss of the inactive gear taking into account current angular speed of the components connected to the inactive gear.

7. The method according to claim 5, comprising determining a load-independent torque loss of the inactive gear taking into account current transmission oil temperature.

8. The method according to claim 5, comprising acquiring current load-independent torque loss of the inactive gear from a data map (46).

9. The method according to claim 8, comprising filling and/or replacing data of the data map (46) with values by measuring load-independent torque loss of the inactive gear on an actual transmission specimen of the vehicle (5).

10. The method according to claim 1, comprising determining current acceleration or retardation level of the electric motor.

11. The method according to claim 1, comprising controlling the electric motor to provide a gradually increasing compensational torque according to a predetermined sequence.

12. The method according to claim 11, wherein the gradually increasing compensational torque comprises a step-wise increasing compensational torque, or a linear or non-linear continuously increasing compensational torque.

13. The method according to claim 1, wherein disengaging the engaged inactive gear comprises controlling a tooth clutch actuating mechanism (48) to apply disengagement force when an estimated and/or measured torque over the inactive gear is within a predetermined torque range, or when the estimated and/or measured torque over the inactive gear is substantially nil, or when a certain time has passed after the electric motor was controlled to provide the compensational torque, or before or simultaneous with controlling the electric motor to provide the compensational torque.

14. The method according to claim 1, wherein the dual clutch transmission is free from a planetary transmission component in the transmission between the electric motor and combustion engine.

15. The method according to claim 1, wherein the compensational torque is applied in the rotational direction of the electric motor during acceleration and opposite the rotational direction of the electric motor during retardation.

16. The method according to claim 1, additionally comprising, after disengagement of the tooth clutch of the inactive gear, controlling the electric motor such that the relative speed between rotating parts of a tooth clutch of a next inactive gear to be engaged is adapted for engagement.

17. The method according to claim 1, wherein a torque sensor is provided for measuring the torque of the output shaft of the electric motor.

18. A computer comprising a computer program for performing the steps of any claim 1 when the program is run on the computer.

19. A non-transitory computer readable medium carrying a computer program for performing the steps of claim 1 when the program product is run on a computer.

20. An electronic control unit for controlling the electric motor of the dual clutch transmission, the electronic control unit being configured to perform the steps of the method according to claim 1.

21. A dual clutch transmission for a vehicle comprising:
a plurality of gears, each gear having an active and an inactive condition, and an engaged and a disengaged condition;
a first and a second transmission counter shaft each carrying at least one gearwheel and a first and a second clutch respectively;
a transmission output shaft carrying at least two further gearwheels, each further gearwheel being in engagement with a respective one of the at least one gearwheel of the first and second transmission counter shafts;
a first tooth clutch on the first transmission counter shaft and a second tooth clutch on the second transmission counter shaft, each shaft clutch for selectively engaging and disengaging a gear of the plurality of gears, each gear being composed of the respective one of the at least one gearwheel and the at least one further gearwheel, and a respective one of the first and second transmission counter shaft, and of the transmission output shaft;
an electric motor drivingly connected to the first transmission counter shaft; and
an electronic control unit configured for, in a vehicle acceleration or retardation mode with an engaged active gear of the plurality of gears through which torque is transmitted between an engine and driven wheels, with an engaged inactive gear of the plurality of gears to be disengaged, and with the electric motor drivingly connected to a shaft of the inactive gear, controlling the electric motor to provide a compensational torque for temporarily decreasing or substantially eliminating torque transferred by the tooth clutch of the inactive gear, and disengaging the engaged inactive gear,
wherein the first and the second clutches are friction clutches, and the electric motor is drivingly connected to the second transmission counter shaft through one of the gears of the plurality of gears.

22. The dual clutch transmission for the vehicle according to claim 21, wherein the dual clutch transmission is adapted to perform the method according to claim 1.

* * * * *